United States Patent
Cattaneo

(10) Patent No.: US 11,598,683 B2
(45) Date of Patent: Mar. 7, 2023

(54) HYDRAULIC BRAKING DEVICE TO BE PLACED ON TEST BENCHES FOR INDUSTRIAL SCREWDRIVERS AND RELEVANT TEST BENCH

(71) Applicant: ATLAS COPCO INDUSTRIAL TECHNIQUE AKTIEBOLAG, Stockholm (SE)

(72) Inventor: Massimiliano Cattaneo, Paderno Dugnano (IT)

(73) Assignee: ATLAS COPCO INDUSTRIAL TECHNIQUE AKTIEBOLAG, Stockholm (SE)

( * ) Notice: Subject to any disclaimer, the term of this patent is extended or adjusted under 35 U.S.C. 154(b) by 0 days.

(21) Appl. No.: 16/959,853

(22) PCT Filed: Feb. 27, 2019

(86) PCT No.: PCT/IB2019/051575
§ 371 (c)(1),
(2) Date: Jul. 2, 2020

(87) PCT Pub. No.: WO2019/166966
PCT Pub. Date: Sep. 6, 2019

(65) Prior Publication Data
US 2020/0386637 A1    Dec. 10, 2020

(30) Foreign Application Priority Data

Feb. 28, 2018   (IT) .................. 102018000003130

(51) Int. Cl.
*G01L 3/20*        (2006.01)
(52) U.S. Cl.
CPC ..................... *G01L 3/20* (2013.01)
(58) Field of Classification Search
CPC ........................................................ G01L 3/20
See application file for complete search history.

(56) References Cited

U.S. PATENT DOCUMENTS

2013/0109375 A1* 5/2013 Zeiler ................. H04W 12/126
                                                    455/426.1
2013/0319704 A1  12/2013 Junkers et al.
(Continued)

FOREIGN PATENT DOCUMENTS

DE      33 05 457 A1   8/1984
DE      296 15 771 U1  1/1997
(Continued)

OTHER PUBLICATIONS

International Search Report dated Jun. 12, 2019 in PCT/IB2019/051575 filed on Feb. 27, 2019.
(Continued)

*Primary Examiner* — Paul M. West
(74) *Attorney, Agent, or Firm* — Oblon, McClelland, Maier & Neustadt, L.L.P.

(57) ABSTRACT

A hydraulic braking device for testing industrial screwdrivers is arranged on a braking simulation bench, the braking device being controlled by an actuator and by a hydraulic control circuit which supplies pressure to the device on the basis of the indications of an electronic elaboration unit of the bench. Such a braking device is provided with coupling means for the screwdriver to be subjected to test and measurement transducers controlled by a processing unit, suitable for measuring the torque exerted by the screwdriver and the rotation angle, and such a device includes a memory which can be read and/or written by the bench electronic elaboration unit.

3 Claims, 2 Drawing Sheets

(56) References Cited

U.S. PATENT DOCUMENTS

| | | |
|---|---|---|
| 2016/0138987 A1 | 5/2016 | Traballoni et al. |
| 2017/0356821 A1 | 12/2017 | Sartori et al. |
| 2019/0162620 A1 | 5/2019 | Cattaneo et al. |

FOREIGN PATENT DOCUMENTS

| | | |
|---|---|---|
| WO | WO 2012/067602 A1 | 0/5201 |
| WO | WO 02/30624 A2 | 4/2002 |
| WO | WO 2014/203117 A1 | 12/2014 |
| WO | WO 2016/103147 A1 | 6/2016 |
| WO | WO 2018/015906 A1 | 1/2018 |

OTHER PUBLICATIONS

Written Opinion dated Feb. 7, 2020 in PCT/IB2019/051575 filed on Feb. 27, 2019.

* cited by examiner

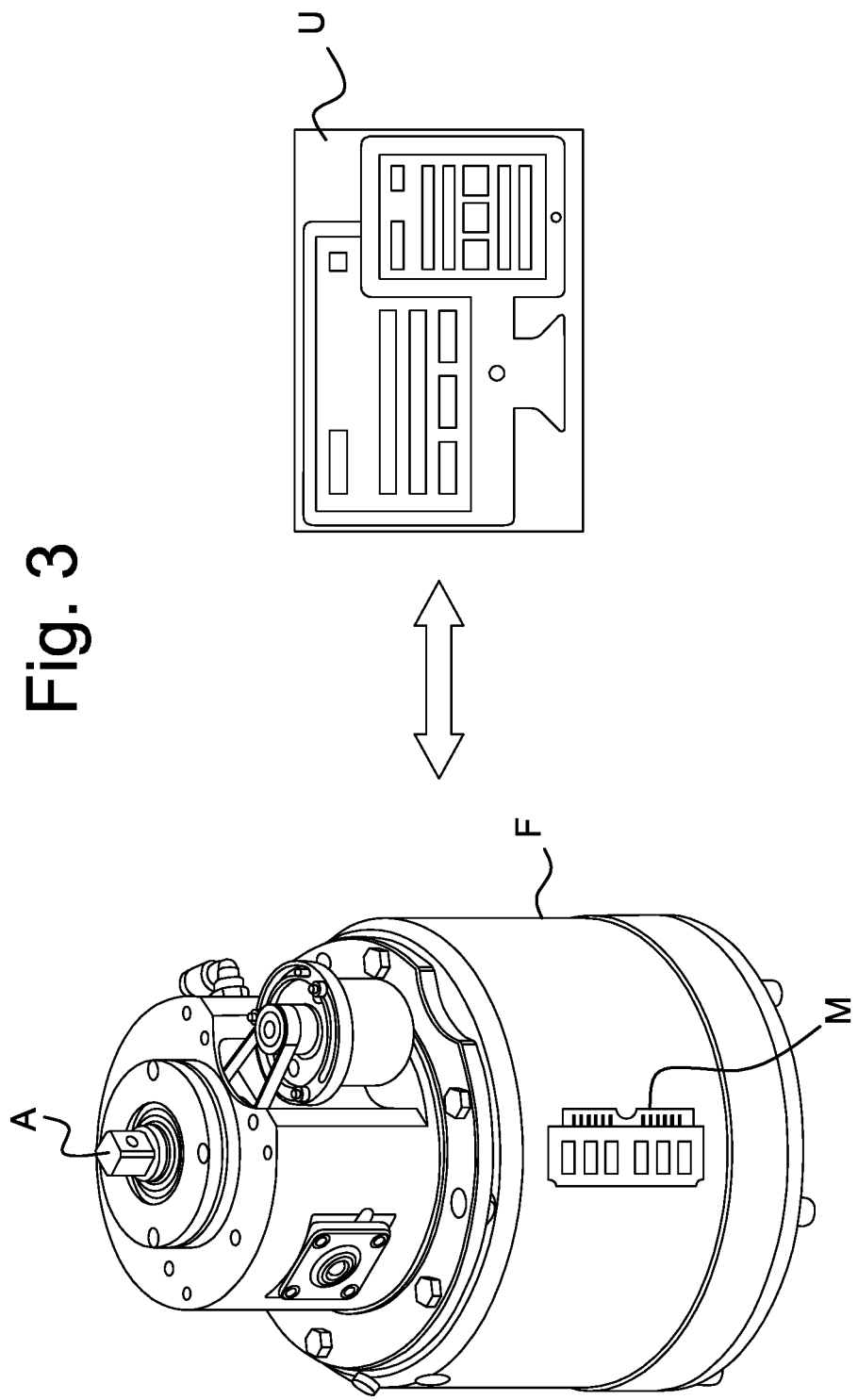

HYDRAULIC BRAKING DEVICE TO BE PLACED ON TEST BENCHES FOR INDUSTRIAL SCREWDRIVERS AND RELEVANT TEST BENCH

The present invention relates to hydraulic braking devices placed in a test bench on which the correct operation of industrial screwdrivers placed on a test bench is checked.

These screwdrivers are tested on test benches, such as the one shown in FIG. 1, described in the patent application WO2014203117 to the same applicant, which comprise a plurality of hydraulic brakes F, to which the screwdrivers A are associated. These brakes are suitably controlled by a hydraulic circuit comprising at least one pump P, at least one pressure regulating valve VP that provides the pressurised fluid to all the brakes of the bench. Each brake is provided with external measuring transducers TR, connected to an electronic elaboration unit U and which are driven by an appropriate program stored thereon. This electronic unit controls both the pump and the pressure regulating valve. The brakes of such a known bench are all fed by the same hydraulic circuit, through a pressure regulating valve in common for all brakes.

A further test bench is described in FIG. 2, which comprises a plurality of hydraulic brakes F1-Fn, with which the screwdriver is associated, suitably controlled by a hydraulic circuit comprising at least one pump P, which withdraws the fluid from a reservoir T and provides it to a pressure regulating valve VP, which in turn provides it to the brakes.

Each brake is provided with measuring transducers TR, connected to an electronic driver board SP, which also controls such regulating valve VP. The bench further comprises an electronic elaboration unit (U) that communicates with such board and that comprises a suitable driving program stored thereon.

Such a driving program, once an operator has selected the brake to be used for testing the screwdriver, is able to progressively increase the braking capacity of the brakes by adjusting the pressure, until reaching a complete stop of the electronic screwdriver.

A hydraulic distributor D is present between such brakes F1-Fn and the regulating valve VP, such hydraulic distributor comprising solenoid valves E1-En able to select, operate and control the hydraulic pressure of each brake to which it is selectively connected.

The electronic elaboration unit, in relation to the type of brake mounted on the bench, knows the nominal features thereof that are conveniently stored offline therein. Clearly, these features may vary over time, while the bench control unit continues to regulate the braking thereof, using the solenoid valves or the hydraulic distributor, according to the nominal parameters of the brake.

Observing the layout of the bench with decoupled brakes, it is possible to notice that there are two separable subsystems, the first comprising the hydraulic system up to the distribution block and the second comprising only the brake. The Applicant has posed the problem of how to know the updated features of the various brakes of the bench and thus adjust the braking based on up-to-date parameters.

The solution proposed by the present invention is to provide the brakes with an internal memory capable of storing various parameters such as, for example, brake transfer function, non-linear system features, diagnostic indicators, serial number and operating log.

One aspect of the present invention relates to a hydraulic braking device that can be arranged on test benches for industrial screwdrivers, having the features of the appended claim 1.

A further aspect of the present invention relates to a test bench provided with such a type of brakes.

The features and the advantages of the present invention will be clearer and evident from the following illustrative and non-limiting description, of an embodiment, made with reference to the accompanying figures which respectively show:

FIG. 3 shows a braking device according to the present invention.

With reference to the aforementioned figures, the bench or the verification system according to the present invention comprises a plurality of hydraulic brakes F1-Fn, with which the screwdriver is associated, suitably controlled by a hydraulic circuit comprising at least one pump P, which withdraws the fluid from a reservoir T and provides it to a pressure regulating valve VP, which in turn provides it to the brakes.

In the system, there is also a manifold C for the collection of the fluid (i.e. oil) placed in the hydraulic circuit downstream of the brakes. The pump is provided with an accumulator ACC and a selector S for changing the maximum pressure of the circuit.

Each brake is provided with external measuring transducers TR, connected to an electronic driver board SP, which also controls such regulating valve VP. An electronic elaboration unit U communicates with said board and comprises a suitable driving program stored thereon.

The driving program, once the operator has selected the brake to be used for testing the screwdriver A, is able to modulate the braking capacity of the brakes by adjusting the pressure, until reaching a complete stop of the electronic screwdriver.

Figure 1:
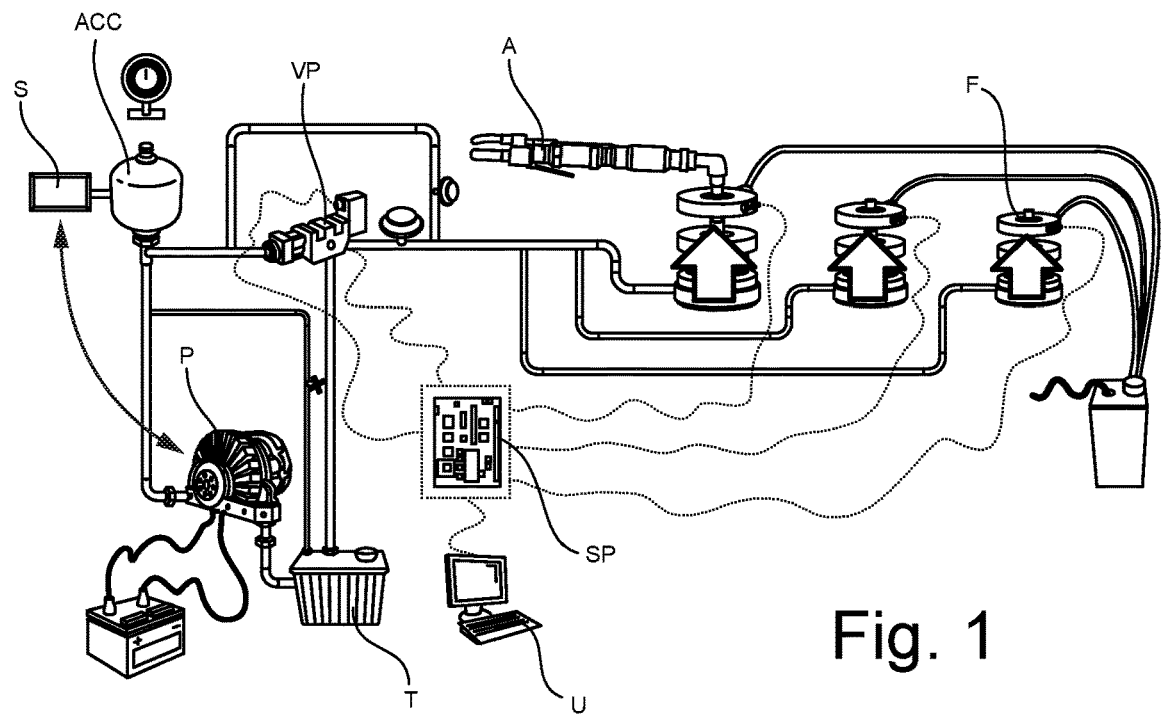
FIG. 1 shows a first type of test bench for checking industrial screwdrivers.

In the bench in FIG. 1, the pressure regulating valve is controlled directly by the processing unit U and is common to all the brakes.

Figure 2:
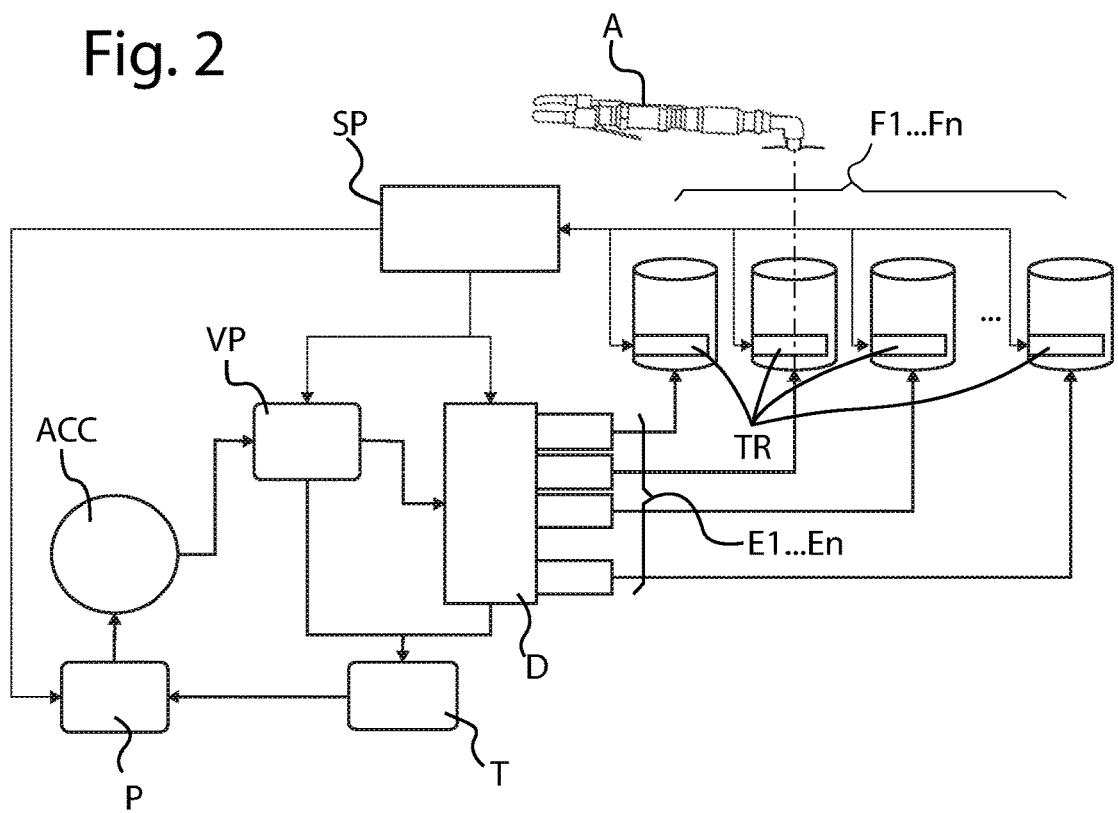
FIG. 2 shows a second type test bench for checking industrial screwdrivers.

In the bench in FIG. 2, a hydraulic distributor D is present between such brakes F1-Fn and the regulating valve VP, such hydraulic distributor comprising solenoid valves E1-En able to select, and activate each brake to which it is selectively connected.

The hydraulic distributor D comprises a number of solenoid valves E1 . . . En corresponding to the number of braking devices present F1 . . . Fn. The electronic elaboration unit U programs the electronic board which enables the valve associated with the brake selected for the test. In this way, the hydraulic power flows from the manifold only to the braking device involved in the test. To avoid consumption and safety problems, 3-way normally closed solenoid valves have been chosen.

In this manner, the pressure is adjusted individually for each brake, thus carrying out a dedicated control on each of them.

According to the present invention, each brake comprises means for coupling A with an industrial screwdriver, a hydraulic brake control actuator and measurement transducers TR which measure the torque applied by the screwdriver on the brake itself and the angle of rotation which communicate with such an electronic unit U, it further comprises a memory which can be read and/or written by the electronic processing unit of the bench.

The communication between the electronic unit and the memory takes place preferably by cable, or by any other equivalent type.

The communication between the brake F and the processing unit U of the bench takes place in a biunivocal way depending on the needs of use, but in any case there is a first initialization step. In this step, initial configuration data are written to memory, including the features of the brake, the torque calibration data and the configuration parameters of the servovalve that controls it.

Each brake is provided with such an actuator controlled in pressure by the servo valve which, in the embodiment of FIG. 2, due to the decoupling of the systems, is now independent and can therefore be optimized starting from a study of the actuation system. Each type of brake has been studied in order to obtain a set of parameters that is excellent for guaranteeing a fast response without pressure fluctuations.

When a braking to be reproduced is selected, the processing unit of the bench according to the present invention automatically suggests the brake suitable for the type of test selected and easily pulls the data from the memory for correct operation.

Such a memory comprises identification data of the brake, such as serial number, manufacturing date; calibration data, such as certificate number, calibration date, operator and historical data such as number of uses and overtorque.

Finally, in the configuration of FIG. 2 in which the brakes are independent of one another, their operation or dynamic features are not influenced by the overall configuration of the bench.

In terms of maintenance, this makes it possible to replace the brakes quickly without having to intervene on a re-calibration of the entire bench.

The invention claimed is:

1. A bench for testing industrial screwdrivers comprising a plurality of braking devices to which an industrial screwdriver can be associated by said devices controlled by a hydraulic circuit comprising at least one pump, taking fluid from a reservoir and supplying the same to a pressure adjustment valve, which in turn supplies the fluid to the braking devices, a hydraulic distributor being provided between said braking devices and the adjustment valve, said distributor comprising solenoid valves able to select, actuate and control hydraulic pressure of each bench brake to which it is selectively connected, such pump, said adjustment valve and said distributor being controlled by an electronic processing unit,
   each braking device being provided with coupling means for said screwdriver to be subjected to test and with external measurement transducers controlled by said processing unit, suitable for measuring torque exerted by the screwdriver and a rotation angle,
   wherein each braking device comprises an internal memory which can be read and/or written by the electronic processing unit, said internal memory comprising identification data of the braking device, and
   wherein the processing unit is configured to select one of the braking devices on a basis of a desired braking operation and to read data from the one braking device for operating the one braking device.

2. The bench according to claim 1, wherein said hydraulic distributor comprises a number of solenoid valves corresponding to a number of the braking devices.

3. The bench according to claim 1, wherein the solenoid valves are normally closed three-way solenoid valves.

* * * * *